United States Patent [19]
Sloteman et al.

[11] Patent Number: 6,012,909
[45] Date of Patent: Jan. 11, 2000

[54] CENTRIFUGAL PUMP WITH AN AXIAL-FIELD INTEGRAL MOTOR COOLED BY WORKING FLUID

[75] Inventors: Donald P. Sloteman, New Hope; Frederic W. Buse, Allentown, both of Pa.; Mark S. Piercey, Sudbury, Mass.

[73] Assignees: Ingersoll-Dresser Pump Co., Liberty Corner, N.J.; Kaman Electromagnetics Corp., Hudson, Mass.

[21] Appl. No.: 08/937,082

[22] Filed: Sep. 24, 1997

[51] Int. Cl.[7] .............................. F04B 17/00; F04B 35/00
[52] U.S. Cl. ........................ 417/366; 415/58.2; 417/370
[58] Field of Search .................... 417/366, 367, 417/370, 423.8; 415/58.2, 58.3, 58.4, 171.1, 106, 54.1

[56] References Cited

U.S. PATENT DOCUMENTS

| | | | |
|---|---|---|---|
| 1,027,624 | 5/1912 | Paulsmeier | 415/58.4 |
| 2,768,583 | 10/1956 | Richard et al. | 417/370 |
| 2,844,418 | 7/1958 | Audemar | 415/58.4 |
| 3,220,349 | 11/1965 | White | 417/370 |
| 3,318,253 | 5/1967 | Campolong | 417/367 |
| 3,572,976 | 3/1971 | Sato | 417/369 |
| 3,644,067 | 2/1972 | Yowell | 417/370 |
| 3,667,870 | 6/1972 | Yoshida et al. | 417/357 |
| 3,733,151 | 5/1973 | Timmons et al. | 417/424 |
| 3,975,117 | 8/1976 | Carter | 417/370 |
| 4,013,384 | 3/1977 | Oikawa | 417/368 |
| 4,684,329 | 8/1987 | Hashimoto | 417/357 |
| 4,728,268 | 3/1988 | Laing | 417/420 |
| 4,890,988 | 1/1990 | Kramer et al. | 417/372 |
| 4,996,457 | 2/1991 | Hawsey et al. | 310/268 |
| 5,044,896 | 9/1991 | Genster | 417/365 |
| 5,117,141 | 5/1992 | Hawsey et al. | 310/114 |
| 5,129,795 | 7/1992 | Hyland | 417/423.12 |
| 5,144,177 | 9/1992 | Rupprecht | 310/86 |
| 5,221,191 | 6/1993 | Leyderman et al. | 417/312 |
| 5,222,874 | 6/1993 | Unnewehr et al. | 417/372 |
| 5,248,245 | 9/1993 | Behnke et al. | 417/366 |
| 5,397,220 | 3/1995 | Akihisa et al. | 417/369 |
| 5,591,017 | 1/1997 | Dwyer | 417/366 |
| 5,641,275 | 6/1997 | Klein et al. | 417/420 |
| 5,833,437 | 11/1998 | Kurth et al. | 417/36 |

*Primary Examiner*—Charles G. Freay
*Assistant Examiner*—Robert Z. Evora
*Attorney, Agent, or Firm*—Robert F. Palermo

[57] ABSTRACT

An integral axial-field motor pump, includes a housing assembly having a working fluid inlet, a working fluid discharge, and a stationary shaft mounted therein. A motor stator is mounted in the housing assembly radially surrounding the stationary shaft and having a seal to prevent exposure to the working fluid; and a motor rotor is axially spaced from the stator and fixed to an impeller having a hub and journaled, by a bearing fixed in the hub, on the stationary shaft within the housing assembly. The rotor also has a seal to prevent exposure to the working fluid. The stationary shaft has an axial passageway formed within it; and there is a provision for conducting working fluid from the working fluid discharge, along sealed surfaces of the rotor and the stator, through the axial passageway within the stationary shaft, to the working fluid inlet to extract heat from the rotor and the stator and to cool the bearing. The threaded engagement of the stationary shaft in the blind hole of the pump case provides for jacking action on the rotor to overcome magnetic forces between the rotor and stator encountered during installation and removal of a permanent magnet equipped motor rotor. Cooling is provided for the working fluid extracted from the fluid discharge prior to introducing it to the cooling channels, when pumping hot fluids.

19 Claims, 4 Drawing Sheets

CENTRIFUGAL PUMP WITH AN AXIAL-FIELD INTEGRAL MOTOR COOLED BY WORKING FLUID

BACKGROUND OF THE INVENTION

This invention pertains, generally, to axial-field integral motor pumps, and more particularly to sealless axial-field integral motor centrifugal pumps and means for cooling such pumps using working fluid.

Conventional sealless canned motor pumps, which commonly use radial field motors, are typically cooled by shunting some of the working fluid from the pump discharge into the pump suction flow through grooves in submerged product lubricated bearings or through another appropriate path to extract heat rejected from the motor stator. The shunted working fluid is heated by convection from the outer stator wall and carries the heat to the suction chamber to be expelled by being pumped away along with the unshunted working fluid. As the shunted fluid passes from the pump discharge chamber, through the passages adjacent to the outer stator wall, and through a hollow rotating shaft, the shaft bearings, and/or other appropriate path to the suction chamber, a phase change may occur due to the combination of fluid heating and pressure drop due to the transition from discharge to suction pressure. This exposure to fluid in the vapor phase can result in overheating and/or bearing failure.

The foregoing illustrates limitations known to exist in current sealless integral motor centrifugal pumps. It would be advantageous to set forth an alternative arrangement directed to overcoming one or more of those limitations. Accordingly, a suitable alternative is provided including features more fully disclosed hereinafter.

SUMMARY OF THE INVENTION

In one aspect of the invention, this is accomplished by providing an integral axial-field motor pump, comprising a housing assembly having a working fluid inlet, a working fluid discharge, and a stationary shaft mounted therein; a motor stator mounted in said housing assembly radially surrounding said stationary shaft and having means for sealing to prevent exposure to said working fluid; a motor rotor axially spaced from said stator and fixed to an impeller having a hub and journaled, by a bearing fixed in said hub, on said stationary shaft within said housing assembly, said rotor having means for sealing to prevent exposure to said working fluid; an axial passageway formed within said stationary shaft; and first means for conducting working fluid from said working fluid discharge, along sealed surfaces of said rotor and said stator, through said axial passageway within said stationary shaft, to said working fluid inlet.

The foregoing and other aspects of the invention will become apparent from the following detailed description when taken in conjunction with the accompanying drawing figures.

DETAILED DESCRIPTION

Figure 1:
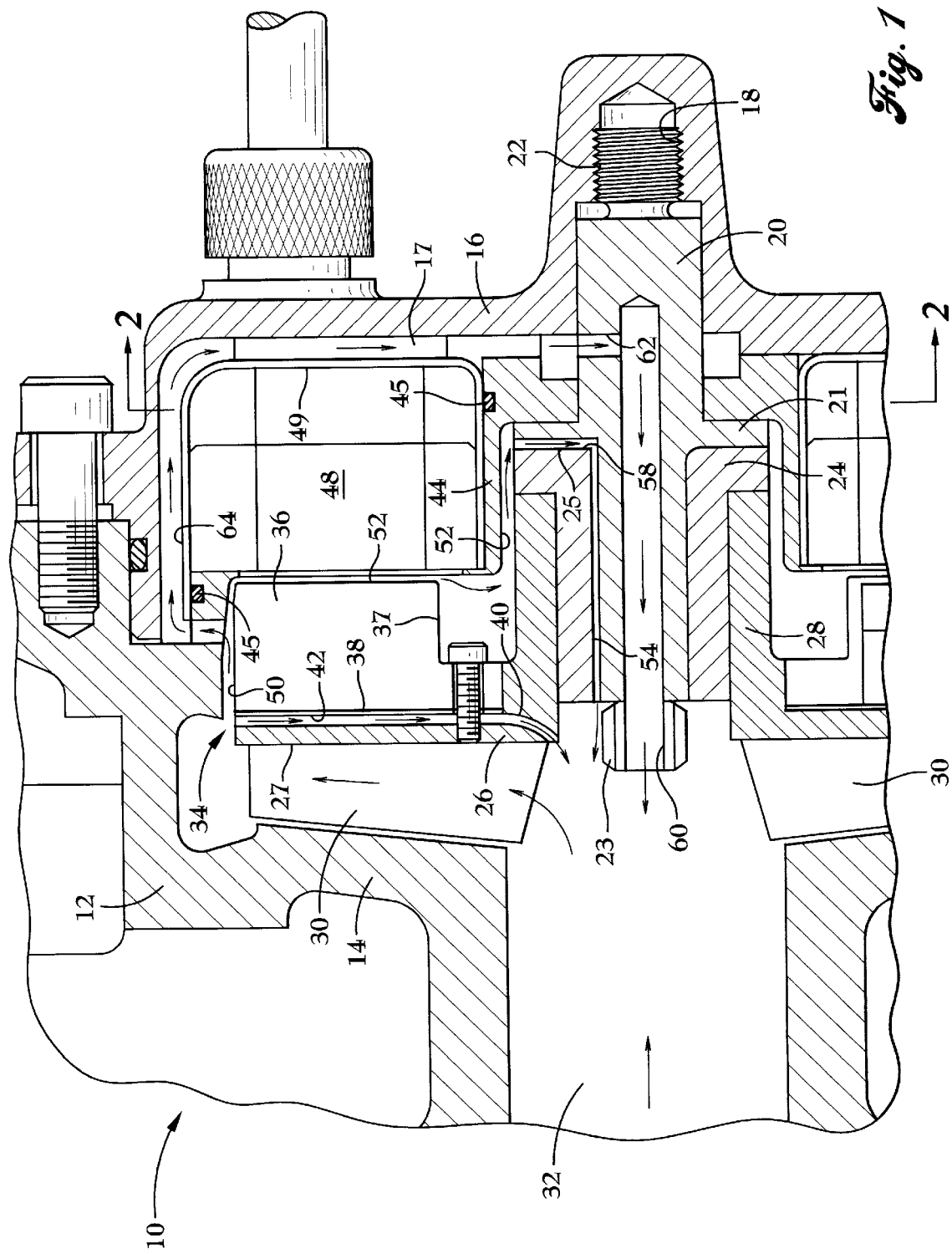
FIG. 1 is an axial cross-sectional view of a portion of an integral axial-field motor pump, according to the invention.

As shown in the figures, an integral axial-field motor pump 10 has a housing assembly 12, which consists of a pump case 14 and a motor case 16. The motor case 16 is fastened to the pump case 14 and has a blind axial threaded bore 18 centered therein. A shaft 20, externally threaded at a first end 22 is fastened in the blind bore 18. The blind bore 18 makes it unnecessary to provide seals around the shaft 20, since the shaft does not extend through the wall of the motor case 16. An impeller 26 has a hub 28 in which a bearing 24 is mounted to journal the impeller on the shaft 20. The impeller 26 has a plurality of vanes 30 extending from the hub 28 along the radially extending back shroud 27 of the impeller and rotates to pump working fluid from a working fluid inlet 32 to a working fluid outlet 34. A motor rotor 36 has a shell 37 on a distal surface and is mounted to the impeller 26 on its proximal surface, or its proximal surface may be integrally formed with the impeller. If separately formed, a shield element 38 is provided on the proximal surface of the rotor to prevent exposure of the magnets of the motor rotor 36 to working fluid. If integrally formed, the shielding is provided by the impeller back shroud. At least one radial passage 42 is provided, either between the motor rotor 36 and the impeller back shroud 27, if separately formed, or through the unitary rotor/impeller body in front of the rotor magnets, to permit flow of a portion of the working fluid from the working fluid discharge 34 to cool the rotor magnets. Flow of working fluid from the working fluid discharge 34 is enhanced by aligning the at least one radial passage 42 with the working fluid discharge 34. This fluid flows radially inwardly through passage 42 and through an aperture 40 in the shroud 27 or the hub 28, depending on impeller design, into the working fluid inlet 32 where it is pumped away with the incoming working fluid. This cooling fluid circuit is actually the third of three cooling fluid circuits of the invention, since it is not always required to provide coolant between the impeller 26 and rotor 36.

Figure 3:
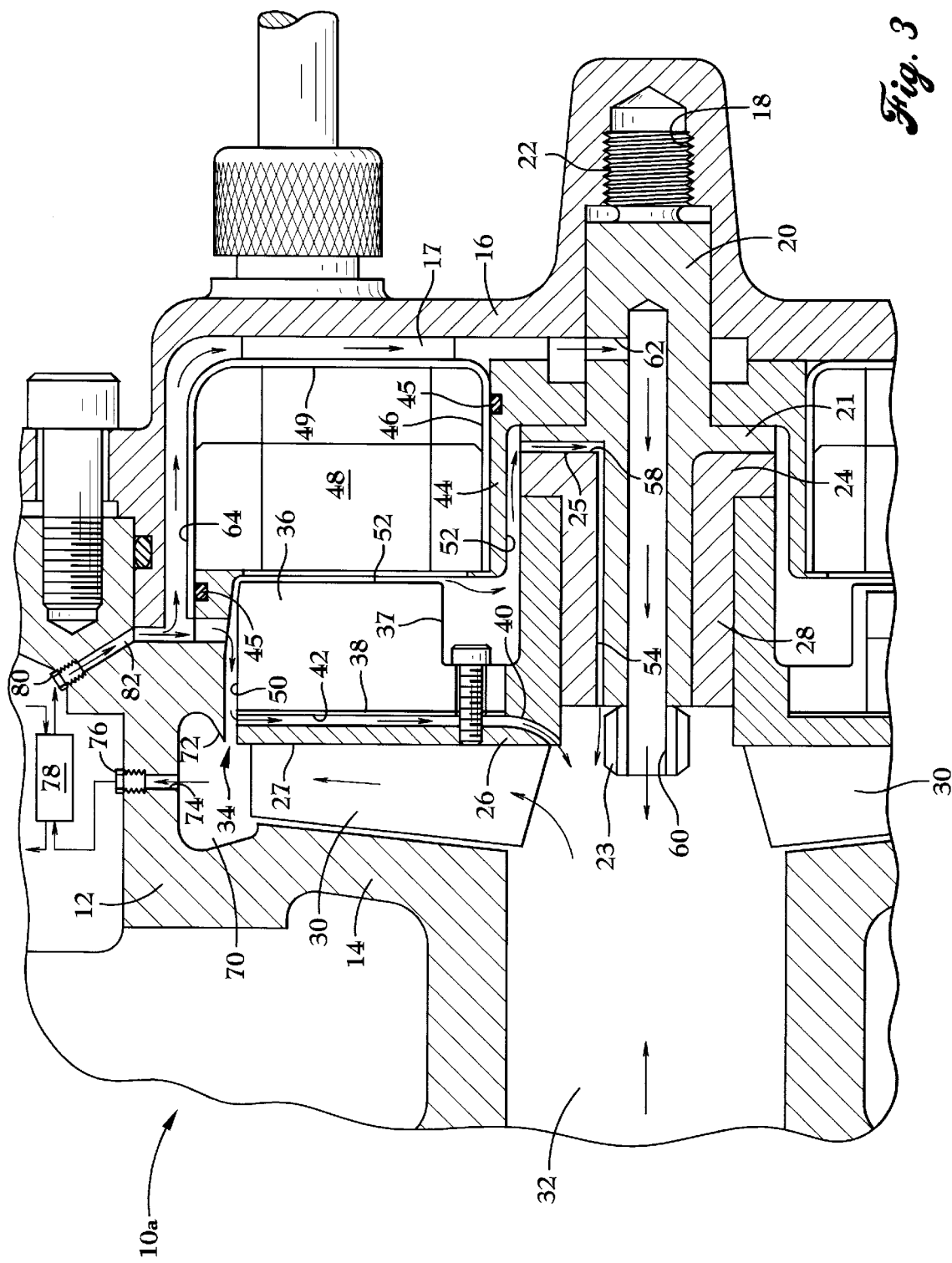
FIG. 3 is a view, as in FIG. 1, of an alternative embodiment of the invention.

The motor case 16 has a number of inner spacers 17 on its circumferential and end surfaces. These spacers, which may be integrally formed on the motor case 16 or separately inserted stand-offs, buttons, or wafers, define a socket for the annular stator 48 with a number of fluid flow channels 64 between the motor case 16 and the shell 49 of the stator 48. (Note that the spacers 17 can also be provided as integrally formed features on the outside of the stator shell 49 to further enhance heat extraction from the stator 48.) As shown in FIGS. 1 and 3, an annular stator cover 44 is axially clamped between the motor case 16 and a radially extending flange 21 of the stationary shaft 20. The stator cover 44 provides a fluid seal against the stator shell 49 by means of o-rings 45 or other suitable seal members. Thus for this embodiment, during assembly, the stator 48 is placed in the motor case 16 against the spacers 17 which form the stator socket and define the fluid flow channels 64 around the stator shell 49. The stator cover 44 is installed over the stator and forms seals against the stator shell 49 by means of o-rings 45. The threaded end 22 of the shaft 20, upon which is mounted the motor rotor 36, is threaded into the internally threaded axial bore 18 of the motor case. A flange 21 on the shaft 20 clamps the stator cover 44 against the motor case to firmly secure the stator in its socket. This threaded installation provides a jacking function, which is needed during installation and removal of the motor rotor 36, to overcome the powerful magnetic forces between the stator 48 and the rotor 36. A gripping provision 23, such as a drive socket, a drive head, or spanner sockets, is provided on the free end of the shaft 20 to permit turning of the shaft for the jacking and tightening functions.

Figure 4:
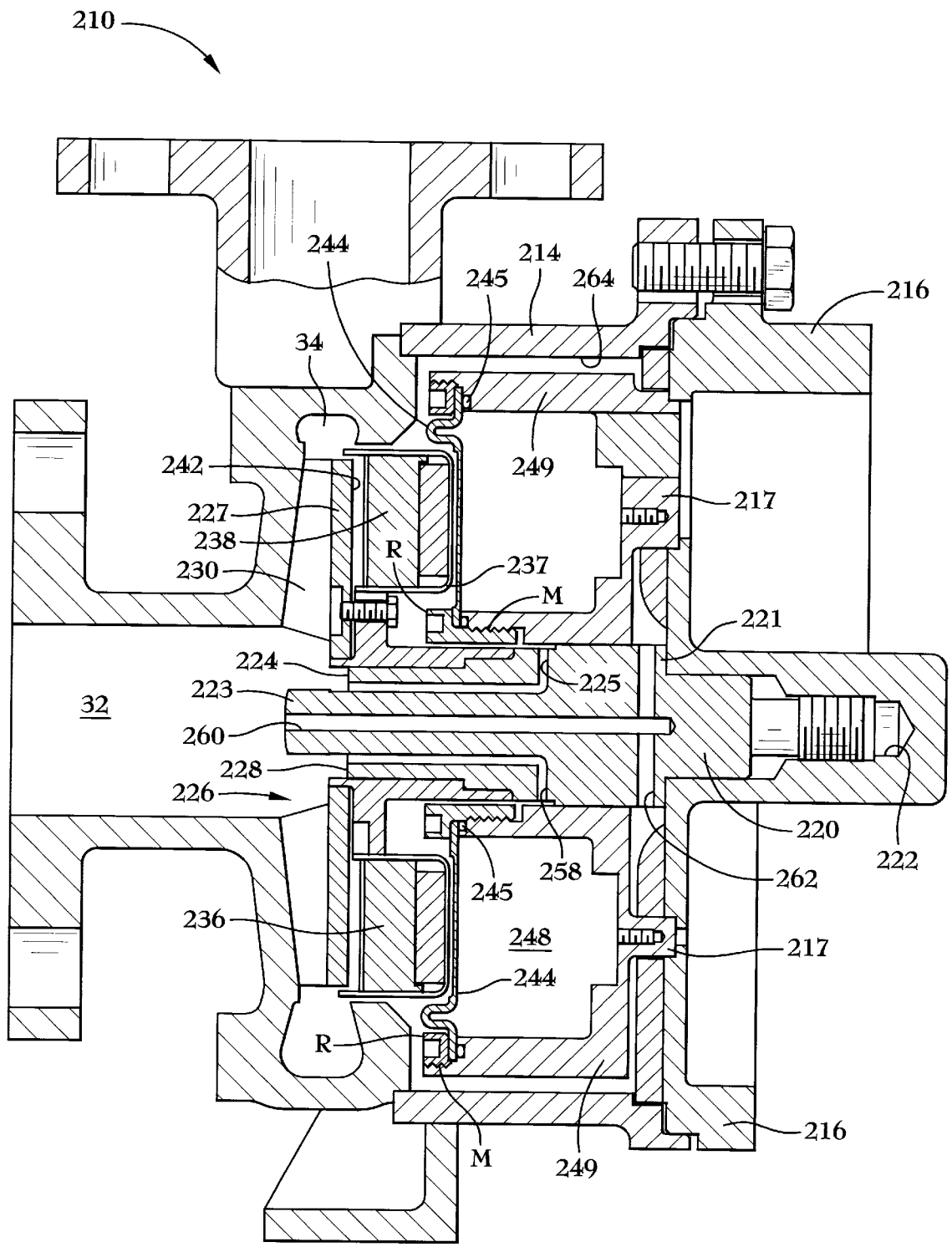
FIG. 4 is an axial cross-sectional schematic view showing an alternative arrangement of the stationary shaft and the stator cover.

The embodiment shown in FIG. 4, provides an alternative means for mounting the stator 248 in the case 216 and cooling it while providing protection from the working fluid. The pump 210 has a housing assembly consisting of a pump case 214 and a motor case 216 which are bolted and gasketed or otherwise firmly fastened and sealed together. Stationary shaft 220 is threaded into a blind threaded hole 222 in the motor case 216, and is encircled by the stator shell 249 which is integral with or firmly attached to the motor case 216. Abutting spacers 217 support the stator shell against the motor case 216 while maintaining the fluid flow channels 264 around the stator shell 249 for flow of cooling fluid. The annular stator cover 244 fits over the annular stator 248 and is attached to the stator shell 249 preferably by means of threaded rings R engaged with mating threads M on the inner and outer edges of the stator shell 249, although it may instead be bolted on. The cover 244 seals against o-rings 245 on the face of the stator shell.

The impeller 226 consists of a hub 228 upon which are supported a number of substantially radial vanes 230 and a back shroud 227 extending radially from the hub. An annular rotor 236 is bolted or otherwise attached to the impeller 226. The rotor has a case 237 to protect its magnets from the working fluid. The hub 228 has a combination radial and thrust bearing 224 fitted within it for journaling the impeller 226 about the stationary shaft 220. Once the rotor/impeller assembly is journaled on the shaft, the shaft 220 is threaded into the blind threaded hole 222 using the drive head 223 for tightening the shaft. This threaded installation of the rotor allows jacking forces to be applied to the rotor 236 to resist the powerful magnetic force attracting it to the stator during installation and to overcome that force during removal.

In all respects, other than the rather substantially different stator cover provisions, the pump of FIG. 4 is substantially identical, in function and in cooling provisions, with those of the other Figures.

In all embodiments, the outer diameter of the rotor 36, 236 is slightly less than the inner diameter of the pump case 14, 214. The resulting gap provides a fluid flow channel 50 from the working fluid discharge 34 between the pump case 14, 214 and the impeller/rotor 26/36, 226/236. A portion of the high pressure working fluid passing through the working fluid discharge 34 is diverted through channel 50. From channel 50 the fluid enters fluid flow channels 64, 164, 264 around the stator shell 49, 249 to cool the stator 48, 248. The fluid, heated by cooling the stator 48, 248, passes through one or more radial bores 62, 262 in the stationary shaft 20, 220, through an axial bore 60, 260, and back to the fluid flow inlet 32. This completes the first or primary coolant loop in the pump of the invention.

Another portion of the fluid passing through channel 50 flows through another channel 52 between the stator cover 44, 244 and the rotor shell 37, 237 and the impeller hub 28, 228. From there, the fluid enters one or more radial bores 58, 258, preferably in the thrust face 25, 225 of the bearing 24, 224, and travels to the surface of the stationary shaft 20, 220 where it enters one or more axial spiral or straight grooves 54, 254, preferably in the surface of the bearing 24, 224, but equally effective for cooling if in the surface of the shaft 20, 220. The groove 54, 254 extends between the radial bore(s) 58, 258 and the working fluid inlet 32 and carries the cooling fluid back to the working fluid inlet. This completes the circulation path for a second cooling circuit to provide cooling to the bearing 24, 224 as well as the stator 48, 248, through the channel 52, 252 between the stator cover 44, 244 and the rotor 36, 236.

Figure 2:
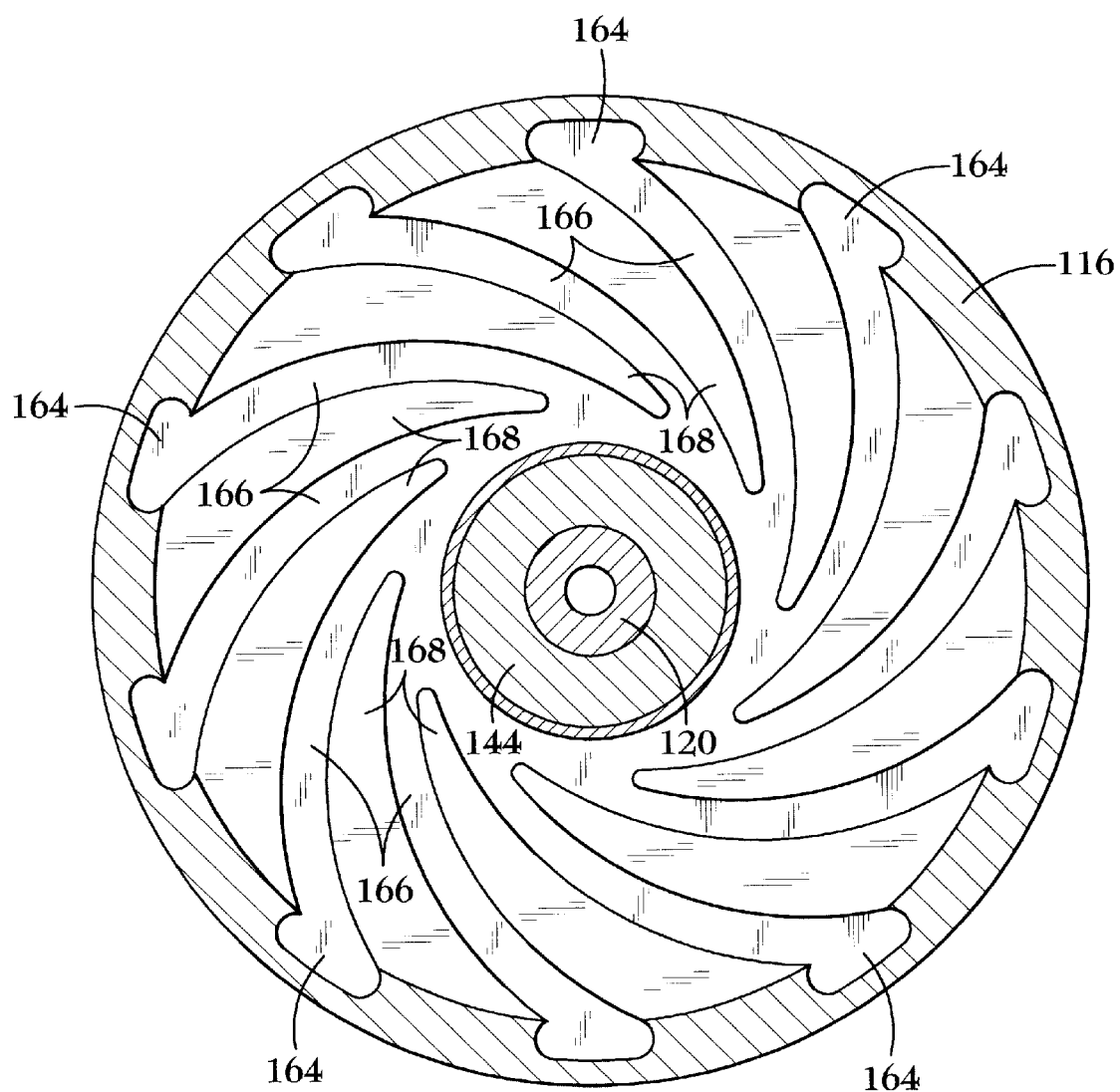
FIG. 2 is a cross-sectional view along section 2—2 of FIG. 1, in which the stator is omitted for clarity of the illustration.

Referring to FIG. 2, an optional configuration of the inner surface of the motor case 116 can be seen, along the axially-directed portion thereof, to have a plurality of grooves 164 formed therein, and the same communicate with spiral-configured channels 166. The spiral configuration is shown as an example only, and it is not intended to preclude other channel shapes or spacings. For example, the spacers could be formed as straight radial fins arrayed in several circular rows from the outer to the inner edge of the stator socket. The channels 166 are defined by pairs of adjacent vanes 168 formed on the motor case surface. By these integrally formed vanes, the spacer function is provided with a flow directing character which can be closely matched to the service requirements of the pump.

In applications for pumping hot working fluid, the pump may be heated by the fluid, or the fluid may be too hot to adequately cool the pump. In such cases, the motor rotor magnets, if the rotor is so equipped, will deteriorate if their temperature becomes too high (above about 250° Fahrenheit), and the motor will fail. It is, necessary to cool the hot working fluid prior to shunting it through the pump, to insure that the fluid will extract heat from the pump. An alternative embodiment of a pump 10a is illustrated in FIG. 3 for use when pumping hot fluids. The pump 10a is substantially identical to the pump 10 of FIG. 1 with the exception that there is a provision for cooling the working fluid before shunting it back into the pump 10a. The volute 70 of the working fluid outlet 34 is modified to include an edge 72 which overhangs the back shroud 27 of the impeller 26 and passage 42. This edge 72 increases flow resistance from the outlet 34 into the channel 50 and effectively inhibits such flow.

A port 74 from the fluid outlet 34 through the pump case 14 is connected to a conduit 76 to carry a portion of the hot fluid through a heat exchanger 78 to reduce its temperature. The size and cooling capacity of the heat exchanger 78 is selected according to the size of the pump and the thermal characteristics of the working fluid, such that, the heat extraction capacity of the heat exchanger is capable of reducing the temperature of the working fluid by the amount necessary to make it effective for cooling the pump rotor 36, the stator 48, and the bearing 24. The cooled working fluid is then returned through a conduit 80 which is connected to a port 82 through the pump case 14. Port 82 delivers the cooled fluid into the housing assembly 12 between the pump case 14 and the motor case 16 from where it flows into fluid flow channels 64, 50, and 52 to complete the three cooling fluid flow circuits described above. The resulting flow through channel 50 to passage 42, together with the flow inhibiting edge 72 of the volute 70, prevents direct flow of hot working fluid into the passage from the fluid outlet 34 and thereby provides cool fluid to the magnets of the rotor 36. Clearly, when required, this embodiment can provide effective motor cooling even when pumping hot fluids, but it also can be used to increase cooling efficiency when pumping cooler fluids.

In operation, the primary cooling circuit carries working fluid from the outlet 34, through channel 50, and through channels 64 to extract heat through the stator shell 49 from the motor stator 48, the main source of motor heating. Most of the stator heat is extracted through channels 64 because of the large volume of flow of cooling fluid through these channels. From channels 64, the fluid enters one or more radial bores 62, in the stationary shaft 20, to reach an axial bore 60 in the shaft, through which it is returned to the low pressure working fluid inlet 32.

The secondary cooling circuit carries working fluid from the outlet 34, through channel 50, and through channel 52 between the stator cover 44 and the rotor 36, to the radial bore 58 in the bearing 24, and thence to the axial groove 54 along the inner surface of the bearing 24, through which it also is returned to the working fluid inlet 32. Since the stator cover is preferably made from non-metallic material, there is limited heat transfer between the stator 48 and the fluid in channel 52, and most of the heat from the stator is removed by the flow through cooling channel 64. Thus, the fluid flowing in channel 52 still has sufficient capacity to cool the bearing 24.

The third circuit for cooling fluid flow assures at least adequate cooling capacity even under marginal thermal conditions. Working fluid flows from the fluid outlet 34 radially inwardly in passage 42 between the back shroud 27 of the impeller 26 and the motor rotor shield 38. This flow extracts, from the rotor 36, any heat generated in it by operation of the motor and returns it directly to the fluid inlet 32 through the aperture 40 in the back shroud 27 or hub 28 of the impeller 26. This cooling circuit enhances the effectiveness of the secondary circuit through channel 52; because, by helping cool the rotor 36, it reduces any potential heat load on the fluid of the secondary circuit, thereby making the secondary circuit more effective for cooling the bearing 24.

The heat generated in the rotor 36 and the stator 48 and extracted through the channels 50, 64, 52, and 42 is apportioned by the design and operating conditions of the pump. In any case, the three circuit cooling scheme of the invention permits control of heat extraction to optimize cooling of the motor rotor 36, the motor stator 48, and the bearing 24 by appropriate control of fluid flow through the three cooling circuits.

By providing separate paths from the heat sources of the three cooling circuits to the low pressure fluid inlet 32, the invention limits the temperature rise of the cooling fluid and reduces the likelihood of flash vaporization of the fluid in the cooling circuits. Flows through the three circuits are balanced by use of restrictive areas in the radial and axial bores 62, 60 of the shaft 20, the radial and axial grooves 58, 54 of the bearing 20, the protruding edge 72 of the volute, and the apertures 40 in the impeller shroud 27 or hub 28.

Having described the invention, we claim:

1. An axial-field integral-motor pump, comprising:
   a housing assembly having a working fluid inlet, a working fluid discharge, and a stationary shaft mounted therein;
   a motor stator mounted in said housing assembly radially surrounding said stationary shaft and having means for sealing to prevent exposure to said working fluid;
   a motor rotor axially spaced from said stator and fixed to an impeller having a hub and journaled, by a bearing fixed in said hub, on said stationary shaft within said housing assembly, said rotor having means for sealing to prevent exposure to said working fluid;
   an axial passageway formed within said stationary shaft; and
   a first means for conducting working fluid from said working fluid discharge, along sealed surfaces of said rotor and said stator, to said axial passageway within said stationary shaft, to said working fluid inlet.

2. The axial-field integral-motor pump of claim 1, further comprising:
   a second means for conducting working fluid from said working fluid discharge, through a gap between said stator and said rotor provided by the axial spacing of said rotor from said stator, through grooves in the bearing fixed within said impeller, to said working fluid inlet.

3. The axial-field integral-motor pump of claim 2, further comprising:
   a third means for conducting working fluid from said working fluid discharge, through one or more radial passages between said rotor and said impeller, through a passage in the hub of said impeller, to said working fluid inlet.

4. The axial-field integral-motor pump of claim 3, wherein said housing assembly comprises a motor case with a stator socket including spacers for separating said stator from said motor case, a pump case including a working fluid inlet port and a working fluid discharge port attached to said motor case, and a means for mounting said stationary shaft in said motor case.

5. The axial-field integral-motor pump of claim 3, further comprising:
   a means for extracting a portion of said working fluid from said working fluid discharge, conducting said working fluid through a heat exchanger to cool said fluid, and reintroducing said fluid to said first means for conducting working fluid along sealed surfaces of said rotor and said stator, to said second means for conducting fluid through said gap between said stator and said rotor, and through said third means for conducting fluid through said one or more radial passages between said rotor and said impeller, to said fluid inlet.

6. The axial-field integral-motor pump of claim 1, further comprising:
   a third means for conducting working fluid from said working fluid discharge, through a plurality of radial passages between said rotor and said impeller, through a passage in the hub of said impeller, to said working fluid inlet.

7. The axial-field integral-motor pump of claim 1, further comprising:
   a means for jacking said rotor against magnetic forces between said stator and said rotor for installation and removal of said rotor during assembly and disassembly of said pump.

8. The axial-field integral-motor pump of claim 7, wherein the means for jacking said rotor against magnetic forces between said stator and said rotor for installation and removal of said rotor comprises a motor case with a stator socket, an internally threaded axial bore, centered in said stator socket, for receiving an externally threaded first end of said shaft, and gripping means on a second end of said shaft for turning said shaft to jack said shaft into and out of said threaded axial bore.

9. The axial-field integral-motor pump of claim 1, wherein said housing assembly comprises a motor case with a stator socket, including spacers for separating said stator from said motor case, and a means for mounting said stationary shaft; and a pump case, including a working fluid inlet port and a working fluid discharge port, attached to said motor case.

10. The axial-field integral-motor pump of claim 9, wherein the means for mounting said stationary shaft comprises an internally threaded axial bore, centered in said stator socket, for receiving an externally threaded end of said shaft.

11. The axial-field integral-motor pump of claim 1, wherein said motor rotor has a casing, and is fixed to said impeller by at least part of said casing being integrally formed with said impeller.

12. The axial-field integral-motor pump of claim 1, wherein the means for sealing said motor stator to prevent exposure to said working fluid comprises a stator shell and a stator cover in sealing engagement with each other to enclose the stator.

13. The axial-field integral-motor pump of claim 12, wherein the stator shell is formed with external fins thereon, said fins defining a plurality of cooling channels between said stator shell and said housing assembly.

14. An axial-field integral-motor pump, comprising:

a housing assembly including a pump case with a working fluid inlet and a working fluid discharge, and a motor case with an annular stator socket and an internally threaded blind bore centered within said stator socket, and a stationary shaft mounted in said threaded blind bore;

a sealed motor stator mounted in said stator socket housing assembly radially surrounding said stationary shaft;

a means on one of said stator socket and said motor stator for spacing said stator from said stator socket to provide a plurality of channels along said motor stator to permit flow of cooling fluid for cooling said stator;

a sealed motor rotor axially spaced from said stator and fixed to an impeller having a hub and a bearing fixed in said hub, said impeller being rotatably mounted on said stationary shaft;

an axial passageway formed within said stationary shaft; and a means for conducting a portion of the working fluid from said working fluid discharge, along surfaces of said rotor to said plurality of channels along said stator, through said axial passageway within said stationary shaft, to said working fluid inlet.

15. The axial-field integral-motor pump of claim 14, further comprising:

a means for conducting a portion of the working fluid from said working fluid discharge, along said rotor, through a gap provided by the axial spacing of the rotor from said stator, and through an axial groove along the inner surface of said bearing adjacent said shaft to said working fluid inlet.

16. The axial-field integral-motor pump of claim 15, further comprising:

a means for conducting a portion of the working fluid from said working fluid discharge, through one or more radial passages between said rotor and said impeller, through a passage in the hub of said impeller, to said working fluid inlet.

17. The axial-field integral-motor pump of claim 16, further comprising:

a means for extracting a portion of said working fluid from said working fluid discharge, conducting said working fluid through a heat exchanger to cool said fluid, and reintroducing said fluid to said plurality of channels along said stator, to said gap between said stator and said rotor, and to said one or more radial passages between said rotor and said impeller, to return said working fluid to said fluid inlet.

18. An axial-field integral-motor pump, comprising:

a housing assembly having a working fluid inlet, a working fluid discharge, and a stationary shaft mounted therein;

a motor stator mounted in said housing assembly radially surrounding said stationary shaft and having means for sealing to prevent exposure to said working fluid;

a motor rotor axially spaced from said stator and fixed to an impeller having a hub and journaled, by a bearing fixed in said hub, on said stationary shaft within said housing assembly, said rotor having means for sealing to prevent exposure to said working fluid;

an axial passageway formed within said stationary shaft;

a means for conducting working fluid from said working fluid discharge, along sealed surfaces of said rotor and said stator, to said axial passageway within said stationary shaft, to said working fluid inlet;

a means for conducting working fluid from said working fluid discharge, through a gap between said stator and said rotor provided by the axial spacing of said rotor from said stator, through grooves in the bearing fixed within said impeller, to said working fluid inlet; and a means for conducting working fluid from said working fluid discharge, through one or more radial passages between said rotor and said impeller, through a passage in the hub of said impeller, to said working fluid inlet.

19. The axial-field integral-motor pump of claim 18, further comprising:

a means for extracting a portion of said working fluid from said working fluid discharge, conducting said working fluid through a heat exchanger to cool said fluid, and reintroducing said fluid along sealed surfaces of said rotor and said stator, to said axial passageway within said stationary shaft; to said gap between said stator and said rotor, through said grooves in the bearing fixed within said impeller; and through said one or more radial passages between said rotor and said impeller, through said passage in said hub, to said fluid inlet.

* * * * *